US010219570B2

(12) United States Patent
Scott

(10) Patent No.: US 10,219,570 B2
(45) Date of Patent: Mar. 5, 2019

(54) FLEXIBLE LIGHTING APPARATUS WITH ADHESIVE FOR MOUNTING TO HELMET OUTER SURFACE

(71) Applicant: Thomas H. Scott, Denver, CO (US)

(72) Inventor: Thomas H. Scott, Denver, CO (US)

( * ) Notice: Subject to any disclaimer, the term of this patent is extended or adjusted under 35 U.S.C. 154(b) by 166 days.

(21) Appl. No.: 15/355,455

(22) Filed: Nov. 18, 2016

(65) Prior Publication Data

US 2018/0140034 A1    May 24, 2018

(51) Int. Cl.
*A42B 3/04* (2006.01)
*F21V 15/01* (2006.01)
*F21V 21/08* (2006.01)

(52) U.S. Cl.
CPC ............ *A42B 3/044* (2013.01); *F21V 15/012* (2013.01); *F21V 21/0808* (2013.01); *C09J 2201/128* (2013.01); *C09J 2201/618* (2013.01)

(58) Field of Classification Search
CPC .......... A42B 3/044; B62J 1/00; F21V 21/084; F21V 21/0808; F21V 21/096; F21V 21/08; F21V 33/0008; F21V 23/04; F21V 15/012; F21L 4/08; F21Y 2103/10
See application file for complete search history.

(56) References Cited

U.S. PATENT DOCUMENTS

| 4,024,312 | A | * | 5/1977 | Korpman | ................. | A61L 15/58 |
| | | | | | | 428/343 |
| 4,080,085 | A | * | 3/1978 | Dickson | ................. | E01F 9/582 |
| | | | | | | 362/235 |
| 4,137,362 | A | * | 1/1979 | Miki | ........................ | C09J 7/243 |
| | | | | | | 428/337 |
| 4,761,720 | A | * | 8/1988 | Solow | ................. | F21V 21/0808 |
| | | | | | | 362/235 |
| 5,128,843 | A | * | 7/1992 | Guritz | ................. | A41D 27/085 |
| | | | | | | 362/103 |
| 5,434,759 | A | * | 7/1995 | Endo | ....................... | G09F 13/22 |
| | | | | | | 362/103 |
| 5,469,342 | A | * | 11/1995 | Chien | ................... | A42B 1/242 |
| | | | | | | 224/660 |
| 5,544,027 | A | * | 8/1996 | Orsano | .................. | A42B 3/044 |
| | | | | | | 2/422 |
| 5,559,681 | A | * | 9/1996 | Duarte | .................... | F21V 21/08 |
| | | | | | | 362/231 |
| 6,001,471 | A | * | 12/1999 | Bries | ........................ | A47G 1/175 |
| | | | | | | 428/343 |
| 6,481,868 | B1 | * | 11/2002 | Lin | ............................ | F21L 4/00 |
| | | | | | | 362/158 |
| 6,761,472 | B1 | * | 7/2004 | Cleaver | ..................... | F21S 4/20 |
| | | | | | | 362/219 |

(Continued)

*Primary Examiner* — Erin Kryukova
(74) *Attorney, Agent, or Firm* — Roger A. Jackson

(57) ABSTRACT

A lighting apparatus is disclosed for mounting on a surface, the lighting apparatus includes a light emitting element plus a planar body having a first side and an opposing second side, the planar body is at least partially transparent, wherein the light emitting element is disposed within the planar body with the light emitting element being positioned between the first and second sides, wherein the light emitting element is visible from the second side. Also included in the lighting apparatus is an adhesive disposed on the first side, with the adhesive being affixed to the surface, the lighting apparatus is operational to enable the surface to have visibility from the light emitting element.

10 Claims, 7 Drawing Sheets

(56) References Cited

U.S. PATENT DOCUMENTS

| | | | | |
|---|---|---|---|---|
| 6,835,452 B1* | 12/2004 | Hamerski | .................. | C09J 7/02 |
| | | | | 248/205.3 |
| 7,695,156 B2 | 4/2010 | Hurwitz | | |
| 7,712,933 B2* | 5/2010 | Fleischmann | ........ | B60Q 1/2696 |
| | | | | 362/495 |
| 8,070,307 B2 | 12/2011 | Ho | | |
| 8,529,082 B1* | 9/2013 | Baker | ................. | F21V 33/0076 |
| | | | | 362/105 |
| 8,608,333 B2 | 12/2013 | Lombard | | |
| 9,379,289 B1* | 6/2016 | Lindblad | ................. | H01L 33/44 |
| 2013/0021811 A1* | 1/2013 | Goldwater | ................. | B62J 6/00 |
| | | | | 362/473 |
| 2013/0135855 A1* | 5/2013 | Wildner | .................. | G09F 9/301 |
| | | | | 362/231 |
| 2013/0201664 A1 | 8/2013 | Harooni | | |
| 2014/0063790 A1* | 3/2014 | Gold | ...................... | A42B 3/044 |
| | | | | 362/106 |
| 2014/0362566 A1* | 12/2014 | Tischler | ................ | F21V 31/005 |
| | | | | 362/230 |
| 2015/0176786 A1* | 6/2015 | Nall | ....................... | H05K 1/189 |
| | | | | 362/217.13 |
| 2016/0150844 A1 | 6/2016 | Das | | |

* cited by examiner

FLEXIBLE LIGHTING APPARATUS WITH ADHESIVE FOR MOUNTING TO HELMET OUTER SURFACE

TECHNICAL FIELD

The present invention relates generally to a lighting apparatus, and more particularly to a lighting apparatus that is designed to mount on a surface to give the surface visibility through the lighting apparatus. More particularly, the specific use of the lighting apparatus is to mount on the outer surface of a bicycle helmet to give the bicycle rider more on the road visibility to other vehicles via taking advantage of the height of the helmet above the road and the movement of the helmet from the rider's head to give more attention to the bicycle helmet mounted lighting apparatus.

BACKGROUND OF INVENTION

Bicyclists on the road are at very high risk from getting hit by other vehicles due to their near invisibility to the other vehicle drivers on the road, bicyclists are at higher risks even than motorcyclists as motorcyclists due move with traffic speed wise and have built in always on head and tail lights which reduces the risks of a motorcyclist getting hit by a vehicle due to better light visibility and moving at parity with traffic flow.

Thus for the bicyclist being almost invisible is compounded by the fact that the bicyclist is moving considerably slower than traffic flow speed wise and accelerating through and clearing intersections much more slowly than other traffic, meaning that the other traffic must see and wait for the bicyclist to clear the intersection to avoid a collision. Some detail on the specific road risks to bicyclists;

1. Intersections—as most motorists typically only look one way (toward oncoming traffic) prior to turning right or left, the bicyclist will seemingly come out of nowhere in their turning path risking a collision, as this is especially compounded by the bicyclist using the sidewalk (or intersection crosswalk) or being on the extreme right side of the road both of which the vehicle driver is not looking at. Further, this same scenario would apply to side driveways, alleyways, and where the motorist is crossing straight through an intersection.

2. Car doors and drivers exiting or entering cars parking along the right side of the street, again if the bicyclist is riding on the right side of the street to avoid being too close to the cars going by on the bicyclists left side, the bicyclists is riding close to the parked cars on the street, thus a collision can occur as the car driver is not looking for or expecting the bicyclists cutting close by their driver's side door or a collision with the driver themselves.

3. Juxtapose risk—if car traffic is at lower speed (i.e. the bicycle is at parity with the car speed wise) or stopped at a red light or stop sign—the bicyclist is positioned directly adjacent to the side of the car—typically the car driver does not see the bicyclist as the car driver looks only ahead through their windshield and glances at the rear view mirrors—which the bicyclists being directly next to the car is in the car driver's "blind spot" and the car driver could easily make a right or left turn right into the bicyclist causing a collision.

Of course the bicyclist's invisibility is even worse at night and statistically almost one-half of the bicycle deaths are at night even though almost all bicycle riding is done in the daytime. Motorists are only used to seeing other cars which of course have much larger profiles or silhouettes than bicycles, further at night cars have their headlights and tails lights spaced apart the width of the car, which in a sense helps another motorist judge whether a car is coming or going and at what rate the car is coming or going via the apparent distance change between the car light sources (from car light source angle change through distance changes), i.e. the ability to ascertain the stroboscopic effect of depth perception which adds greatly to figure out the car's positional relation to the motorist and the rate of change of the car's position.

As an example, as a car approaches a stationary positioned individual (on the side of the road) from the front of the car, the cars headlights appear to get closer together due to the individual's viewing angle change as the car gets closer to the individual, and conversely as the rear of the car moves away from the individual, the tail lights appear to move apart.

Now moving to the bicycle, even with a bicycle headlight and a tail light—we have basically a single point of light reference to the stationary positioned individual, wherein a single point of light—no matter how bright the light is, being very difficult for the stationary positioned individual to ascertain whether the light is coming or going and at what rate the light is coming or going in relation to the stationary positioned individual, thus the result is that the single point of light is not effectively telling of its change of position to the stationary positioned individual.

Thus this is one of the reasons that the single bicycle headlight and tail light are not very good at adding to the bicyclist's visibility, although certainly the single bicycle headlight and tail light are better than no lights, they are not effective for judging distance and the rate of change of that distance, plus motorists are used to other cars having the spaced apart headlights and tail lights being what the motorists will most likely recognize, especially at night.

Thus an improved solution is to make the bicycle appear at night like a car—i.e. with multiple spaced apart sources of light—not only is there the benefit of more lights, but more importantly the multiple light apparent positional relationship to one another enables the motorist to better ascertain if the bicyclist is approaching them or moving away from them, and at what rate. The bicycle helmet is an excellent place to add lighting for several reasons—the increased height above the road (in relation to bicycle headlights and tail lights)—the higher the light from the road the more visible the light is to the motorist—in fact automotive taillights have gotten considerably higher from the road in the last 50 years—as a proven simple way to be more visible and reduce collisions, also the bicyclists head is constantly moving which means that the helmet lights are constantly moving, further adding to visibility to the motorist.

Statistically bicycle riding is dangerous with the death rate about four times as high as motorists per mile traveled, recently in the United States there are just under one-thousand (1,000) bicycle accident deaths and about fifty-thousand (50,000) bicycle accident injuries for the year in available data from 2014 according to the NHTSA and CDC.

Thus the prior art recognizes these issues with various apparatus and devices that assist the individual in being recognized in an integral helmet lighting system, looking at U.S. Pat. No. 8,608,333 to Lombard, wherein disclosed is a helmet including a lighting system permanently integrated into the helmet, the lighting system comprising: a first layer; light emitting means mounted to the first layer, wherein the light emitting means are light emitting diodes; a controller means mounted to the first layer for controlling the light emitting means.

Also included in Lombard is a wiring means for linking the light emitting means to the controller means; a second layer fixably attached to the first layer thereby providing an area between said first and second layer for the light emitting means forming a lighting chamber channel on the outer shell of the helmet, a controller means, and a wiring means.

Further in Lombard is a power means fixably attached to the second layer for powering the controller and light emitting means; and an operating means functionally linked to the controller means for operating the controller means; wherein the operating means is functionally linked to a signaling device.

Lombard limits itself to either being integral to the helmet or having a fixed fitted shell to an existing helmet, see Lombard FIGS. 3, 4, 6, and 11, although with the numerous helmet sizes and shapes in existence it would be difficult to imagine the Lombard apparatus fitting well or looking professional in appearance, and further the need to completely cover the helmet in LEDs is questionable for safety reasons wherein external visibility in only needed laterally in an omnidirectional manner and an excessive number of LEDs adds unnecessary cost and higher electrical power drain on the power supply thus shortening the illumination time. In addition in Lombard, the lighting chamber channel adds undesirable weight and bulk to the helmet while of being of dubious benefit for external lighting recognition.

Continuing in the prior art for the illuminating helmet arts in United States Patent Application Number 2016/0150844 to Das, disclosed is an illuminating helmet cover configured to attach with a helmet, such as a motorcycle helmet, bicycle helmet, construction helmet, or the like. The illuminating helmet cover in Das includes a plurality of illuminating elements, such as light-emitting diodes, lamps, or reflective surfaces, which allow a user to be more easily visible, wherein the plurality of illuminating elements are coupled with one or more strands that are configured to extend over the helmet, such as in the form of a netting.

The illuminating helmet cover in Das fastens to the helmet via one or more coupling components, such as clamps, hooks, adhesives, Velcro, etc. A power source in Das is connected with the one or more strands for providing power to one or more of the plurality of illuminating elements with operation of the plurality of lights able to be customized by the user, for example, by changing colors, strobe patterns, and/or brightness or intensity. While Das maybe interchangeable with different helmet sizes and shapes the Das lighting net does not easily attach/detach from the helmet, plus there would be questions of durability and style of the lighting net for the helmet user.

Further in the illuminated helmet prior art in United States Patent Application Number 2013/0201664 to Harooni, disclosed is a partial ring of LED lights integrated into the bottom facing base surface of a bicycle helmet that, when on provides a bright illumination directed downwards away from the bottom base of the helmet with focused and directed light rays. In this configuration in Harooni, when the helmet is worn by a bicycle rider, the downwards direction of the light produced by the partial LED light ring serves to brightly illuminate the rider, the bicycle, and the ground road surface below in low light or nighttime conditions.

The light thus produced in Harooni by this invention serves to illuminate not forwards or backwards but the moving subject itself and directly, making the moving subject highly visible to approaching vehicles or other moving subjects, however, causing added bulk to the helmet rim thickness, see FIG. 2, and further making for a special integrated helmet thus not being an interchangeable system for existing helmets. Harooni has a lack of a physical structure teaching as to the LED light apparatus system and merely discloses a functional concept of directing light downward over the bicycle rider onto the surface for visibility, which could conceivably interfere the bicycle rider's forward night vision due to the brightness of the helmet LEDs on the rider's eyes.

Continuing in the prior art in the illuminated helmet arts in U.S. Pat. No. 8,070,307 to Ho disclosed is a light-emitting warning device of a safety helmet, comprising: a helmet main body, an annular locating groove and a receiving cavity being formed on an outer face of the helmet main body, the locating groove having two end sections in communication with or adjacent to the receiving cavity; a light guide element, which is an elongated flexible strip body with light guiding property, the light guide element being received in the locating groove, two end sections of the light guide element extending into the receiving cavity, the light guide element being at least partially exposed to outer side of the locating groove; and a light source control mechanism having at least one internal light source body.

Also included in Ho is at least one control switch, by means of the control switch, a state of electric connection between the light source body and a power source being variable, whereby when the light source body is turned on, the light source body projects light into the end sections of the light guide element that extend into the receiving cavity, wherein the receiving cavity communicates with the locating groove via at least one through hole formed in the helmet main body such that the through hole extends from the receiving cavity to the locating groove, and the through hole is formed in a middle section of the locating groove in communication with an interior of the helmet main body. In Ho, a special helmet is required, see Ho FIGS. 3, 4, and 5 to receive the light guide element that is a light reflecting tube into an annular locating groove, thus there is no interchangeability of helmets possible with the Ho light guide element.

Further, in the helmet illumination arts in U.S. Pat. No. 7,695,156 to Hurwitz disclosed is an illuminated helmet, comprising: an interior cushion; an outer translucent shell including side, back, front and top walls to cover the entire helmet, the outer shell having a plurality of transparent displays and opaque sections dispersed on each of said walls of the outer shell so that a substantial portion of said outer shell is covered with the transparent displays; plus an electroluminescent light source with an electroluminescent sheet is provided and located between the interior cushion and the outer shell positioned under the transparent displays for emission of light through the plurality of transparent displays of the walls of said outer shell.

In Hurwitz, the electroluminescent sheet substantially covering the entire outer surface of the interior cushion and being aligned with the transparent displays to provide omnidirectional illumination to the illuminated helmet, see Hurwitz FIGS. 3a and 3b. Also in Hurwitz, a battery being connected to an inverter for supplying direct current thereto, the inverter being connected to the electroluminescent light source for supplying alternating current thereto; and the interior cushion comprises a cut-out for housing the battery and inverter therein. Thus in Hurwitz, again a special helmet is required for the illumination system, and as Hurwitz is more of a decorative than safety device, there is no particular teaching as to illumination brightness or outside environmental recognition of the illuminated helmet.

What is needed is a helmet lighting apparatus that is totally interchangeable or can be adapted to any helmet to accommodate a user's existing helmet, thus not requiring the user to purchase another new special helmet to accommodate an lighting system. Other desirable features of the helmet lighting apparatus would include easy mounting and dismounting, flexibility to adapt to numerous helmet sizes, shapes, and types, plus for the helmet lighting apparatus to have a small size and weight factor, long battery life, quick recharge ability, and most importantly a high external environment recognition factor both day and night from the helmet lighting to the motorist.

SUMMARY

A Flexible Lighting Apparatus With Adhesive For Mounting To Helmet Outer Surface is disclosed for mounting on a surface, the flexible lighting apparatus includes a light emitting element plus a planar body having a first side and an opposing second side, the planar body is at least partially transparent, wherein the light emitting element is disposed within the planar body with the light emitting element being positioned between the first and second sides, wherein the light emitting element is visible from the second side. Also included in the flexible lighting apparatus is, a flexible strip having a primary surface and an opposing secondary surface, with a longitudinal axis and a perpendicularly positioned lateral axis disposed between said primary and secondary surfaces, wherein said primary surface is coated with an adhesive layer and said secondary surface is coated with an adhesive layer, wherein said primary surface is adhered to said planar body first side and said secondary surface is adhered to the surface, the lighting apparatus is operational to enable the surface to have visibility from the light emitting element.

These and other objects of the present invention will become more readily appreciated and understood from a consideration of the following detailed description of the exemplary embodiments of the present invention when taken together with the accompanying drawings, in which;

BRIEF DESCRIPTION OF DRAWINGS

FIG. 7 shows a side elevation view of the lighting apparatus as depicted in FIG. 6, wherein FIG. 7 shows the helmet outer surface, the planar body with lighting elements, the light area, the flexible strip including a non-adhesive portion, plus the viscoelasticity of the flexible strip showing an area reduction with pulling along the longitudinal axis showing the area reduction along the longitudinal axis with a shear de-bonding of the adhesive as between the helmet outer surface and the secondary surface of the flexible strip.

REFERENCE NUMBER IN DRAWINGS

Figure 1:
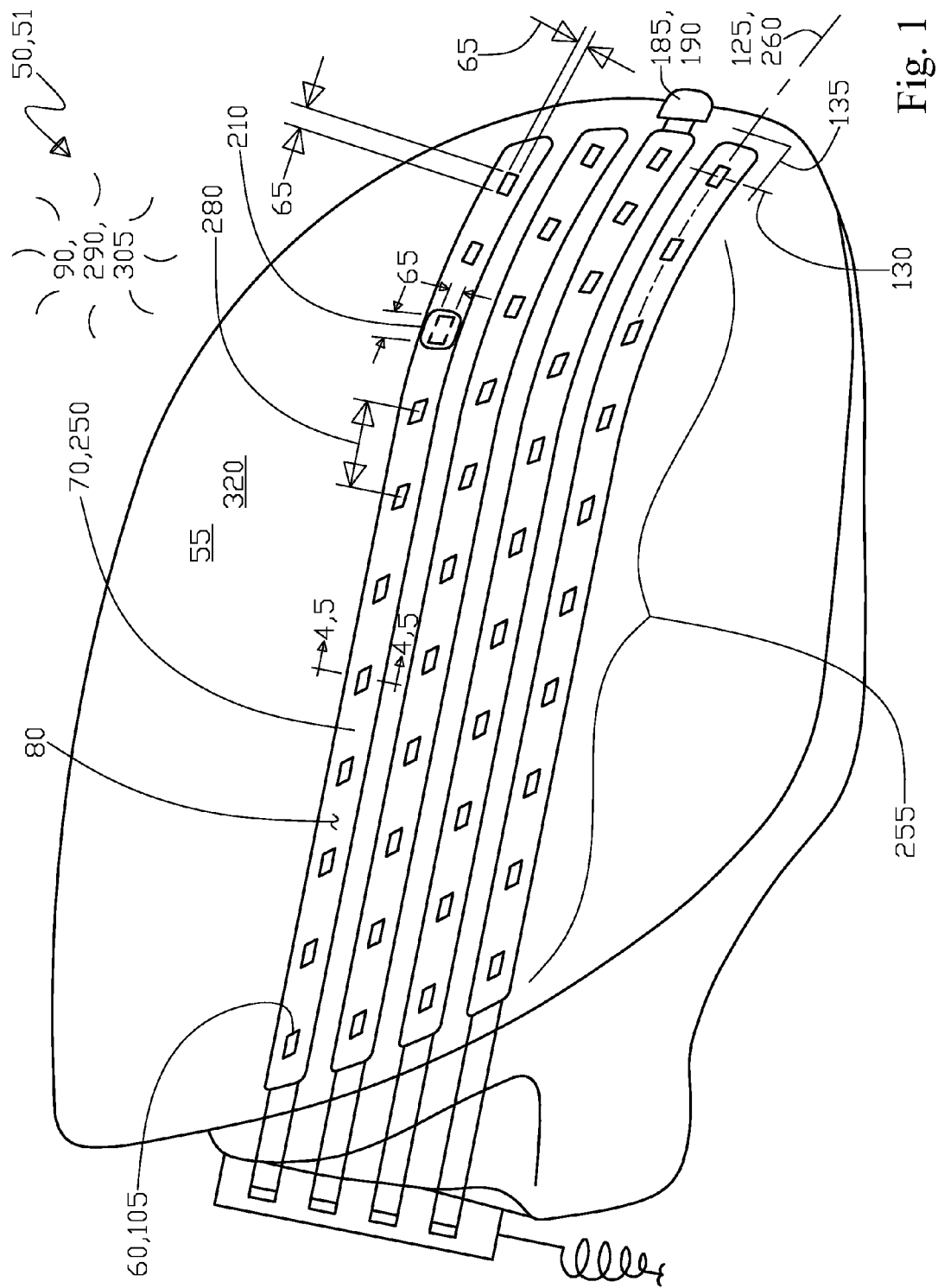
FIG. 1 shows a perspective view of the lighting apparatus that is affixed to a helmet outer surface wherein a plurality of light emitting elements are disposed within a planar body to give the helmet outer surface visibility.

50 Flexible Lighting Apparatus With Adhesive For Mounting To Helmet Outer Surface
51 Alternative embodiment of the lighting apparatus 50
55 Surface
60 Light emitting element
65 Light area of light emitting element 60
70 Planar body
75 First side of planar body 70
80 Second side of the planar body 70
85 Light emitting element is disposed within said planar body 70 positioned between the first 75 and second 80 sides
90 Light emitting element being visible from the second side 80
95 Adhesive layer
100 Adhesive affixed to the surface 55
105 Surface having visibility from the light emitting element 60
110 Flexible strip that is preferably viscoelastic in nature
115 Primary surface of the flexible strip 110
120 Secondary surface of the flexible strip 110
125 Longitudinal axis of the flexible strip 110
130 Lateral axis of the flexible strip 110
135 Perpendicular position of the longitudinal 125 lateral 130 axes
145 Primary surface 115 adhered to the planar body 70 first side 75
150 Secondary surface 120 adhered to the surface 55
155 Adhesive 95 having higher cohesive strength to the flexible strip 110
160 Adhesive 95 having lower adhesive strength to the surface 55
165 Viscoelastic strip 110 stretch of at least one and one-half times the original dimension 175 along the longitudinal axis 125
170 Viscoelastic strip 110 stretch of at least one and one-half time the original dimension
180 along the lateral axis 130
175 Original dimension of the viscoelastic strip 110 along the longitudinal axis 125
180 Original dimension of the viscoelastic strip 110 along the lateral axis 130

185 Free end portion of the viscoelastic strip 110 not having adhesive 95
190 Free end portion extending beyond the planar body 70
195 Manually pulling the free end portion 190 substantially parallel to the longitudinal axis 125
200 Area reducing of the viscoelastic strip 110 along the longitudinal 125 and lateral 130 axes
205 Shear de-bonding state of the adhesive 95
210 Rigid plano convex lens
215 Plano side of the rigid plano convex lens 210
225 Convex side of the rigid plano convex lens 210
230 Plano side faces the light emitting element 60, 65
235 Lens distance as between the light emitting element 60, 65 and the plano side 215
237 Light source being further from the lens 210 than the focal point 239
238 Light source being closer to the lens 210 than the focal point 239
239 Focal point of the lens 210
240 Focal point distance of the rigid plano convex lens 210 with solid lines indicating light rays parallel at the focal point 239
245 Amplify of the light area 65 of the light emitting element 60 via the rigid plano convex lens 210 with dashed lines indicating diverging light rays with a light source being closer 238 to the lens 210 than the focal point 239
246 Phantom dashed lines indicating converging light rays with a light source being further 237 to the lens 210 than the focal point 239
250 Elongated flexible body
255 Band form of the elongated flexible body 250
260 Lengthwise axis of the elongated flexible body 250
265 Planar first side of the elongated flexible body 250
270 Outwardly projecting arcuate second side of the elongated flexible body 250
275 Disposed light emitting elements within the elongated flexible body 250
280 Spaced apart manner of each of the plurality of light emitting elements 60 along the lengthwise axis 260
285 Positioned light emitting elements 60 as between the planar first side 265 and the outwardly projecting arcuate second side 270 of the elongated flexible body 250
290 Light emitting element being visible from the outwardly projecting arcuate second side 270 of the elongated flexible body 250
295 Adhesive 95 disposed on the planar first side 265
300 Adhesive 95 affixed to the helmet outer surface 320
305 Helmet outer surface 320 having visibility from the plurality of light emitting elements 60
310 Secondary surface 120 is adhered to the helmet outer surface 320
315 Adhesive having lower adhesive strength to the helmet outer surface 320
320 Helmet outer surface form of the surface 55
350 Bicyclist
355 Rechargeable battery pack
360 Alternating Current recharge adaptor
365 Terminal strip for the lighting elements 60
370 Electrical communication from the rechargeable battery pack 355 to the terminal strip 365
375 Electrical communication from the Alternating Current recharge adaptor 360 to the rechargeable battery pack 355

DETAILED DESCRIPTION

With initial reference to FIG. 1 shown is a perspective view of the lighting apparatus 50 that is affixed 100 to a helmet outer surface 55, 320 wherein a plurality of light emitting elements 60 are disposed 85 within a planar body 70 to give the helmet outer surface 55, 320 visibility 90, 290, 305.

Figure 2:
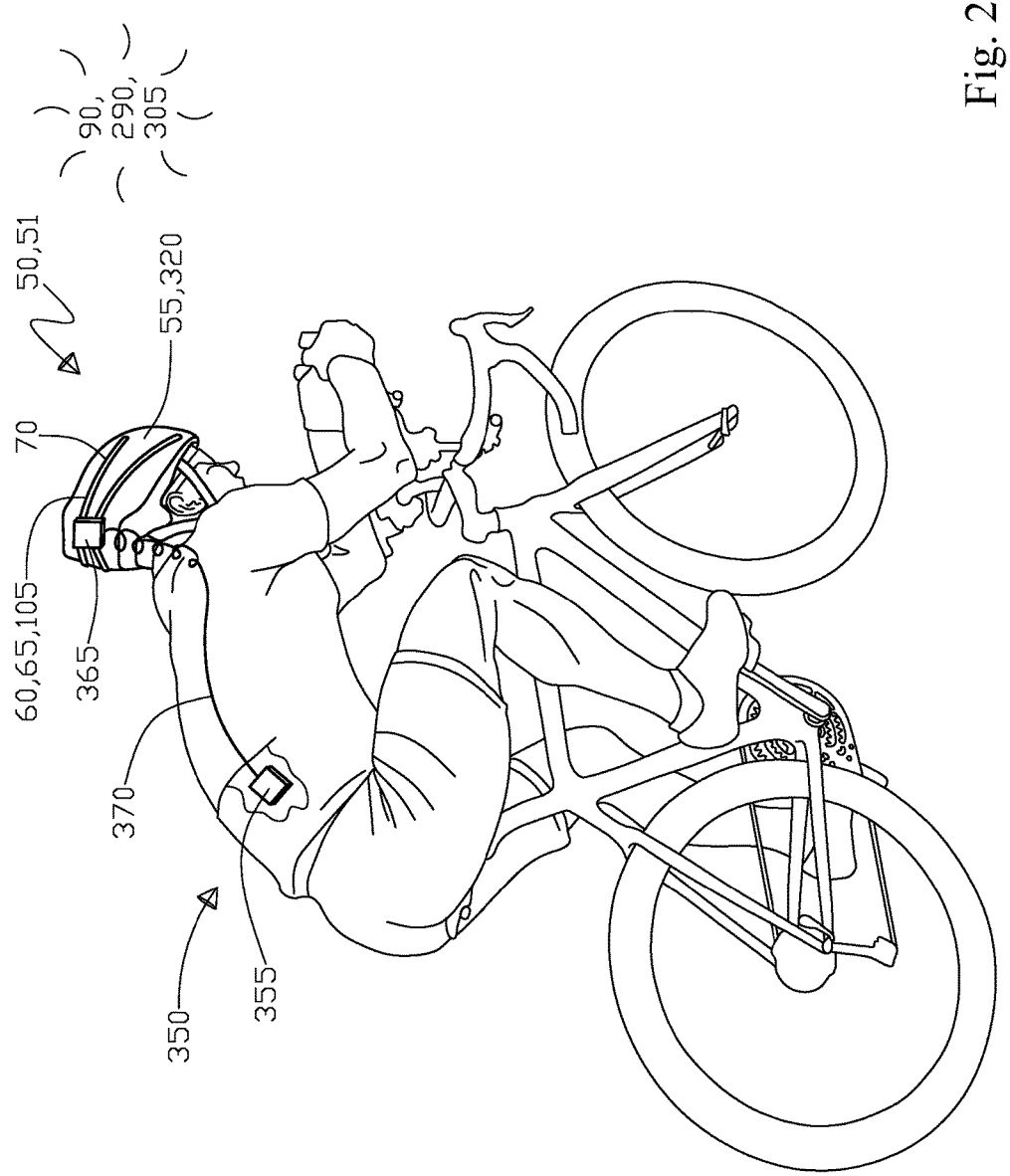
FIG. 2 shows a perspective use view of the lighting apparatus that is affixed to a helmet outer surface wherein a plurality of light emitting elements are disposed within a planar body to give the helmet outer surface visibility of a bicyclist, note also a battery pack that is in electrical communication with a terminal strip that is in electrical communication with the plurality of lighting elements.

Continuing, FIG. 2 shows a perspective use view of the lighting apparatus 50 that is affixed 100 to the helmet outer surface 55, 320, wherein a plurality of light emitting elements 60 are disposed 85 within the planar body 70 to give the helmet outer surface 55, 320 visibility 90, 290, 305 of a bicyclist 350, note also a battery pack 355 that is in electrical communication 370 with a terminal strip 365 that is in electrical communication with the plurality of lighting elements 60 that are disposed 85 within the planar body 70.

Figure 3:
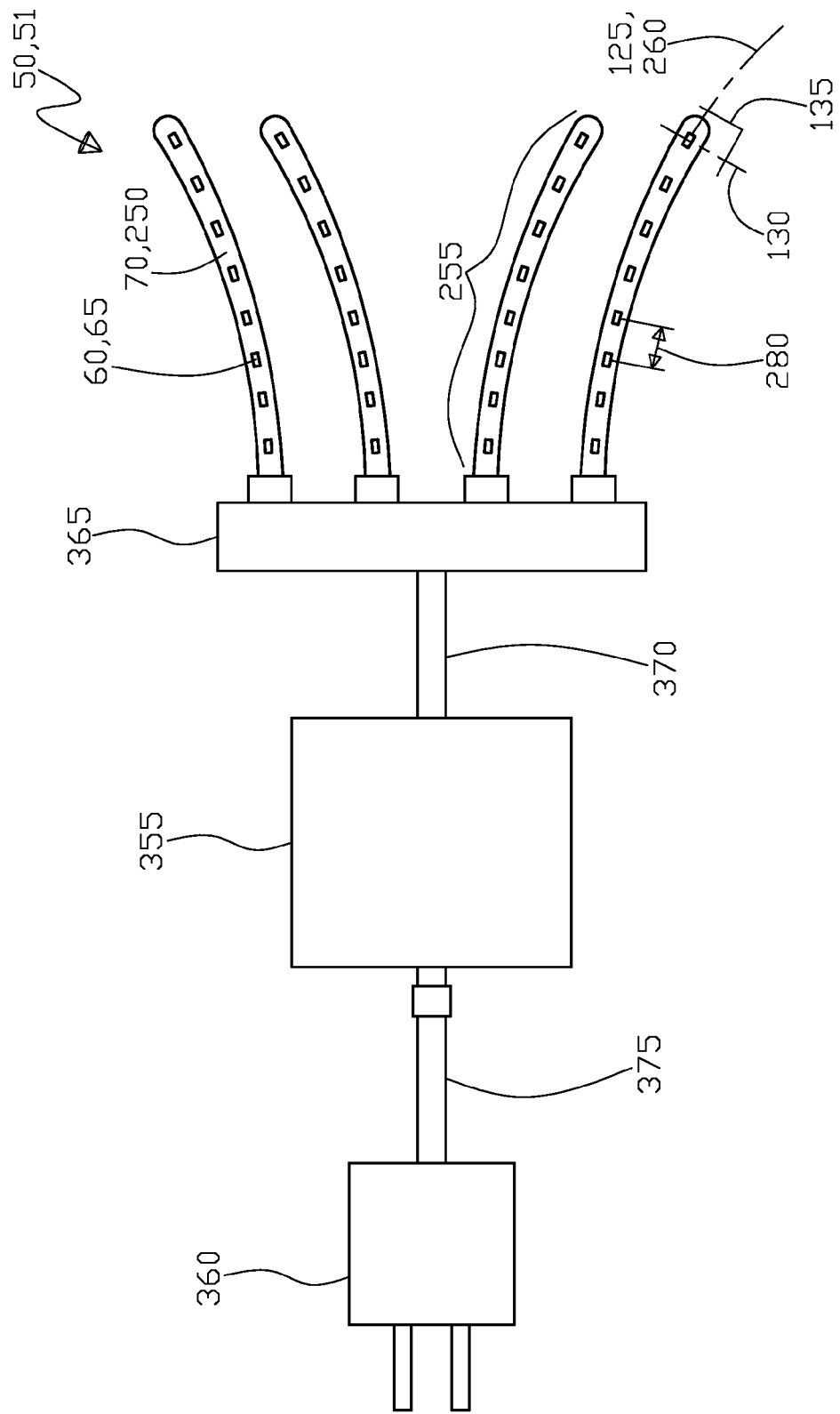
FIG. 3 is a diagrammatic electrical layout of the lighting apparatus showing the Alternating Current battery recharge adapter, a the electrical communication to the rechargeable battery, the electrical communication to the terminal strip going to the plurality of lighting elements disposed within the planar body.

Next, FIG. 3 is a diagrammatic electrical layout of the lighting apparatus 50 showing the Alternating Current battery recharge adapter 360, an electrical communication 375 to the rechargeable battery 355, the electrical communication 370 to the terminal strip 365 going to the plurality of lighting elements 60 disposed 85 within the planar body 70.

Figure 4:
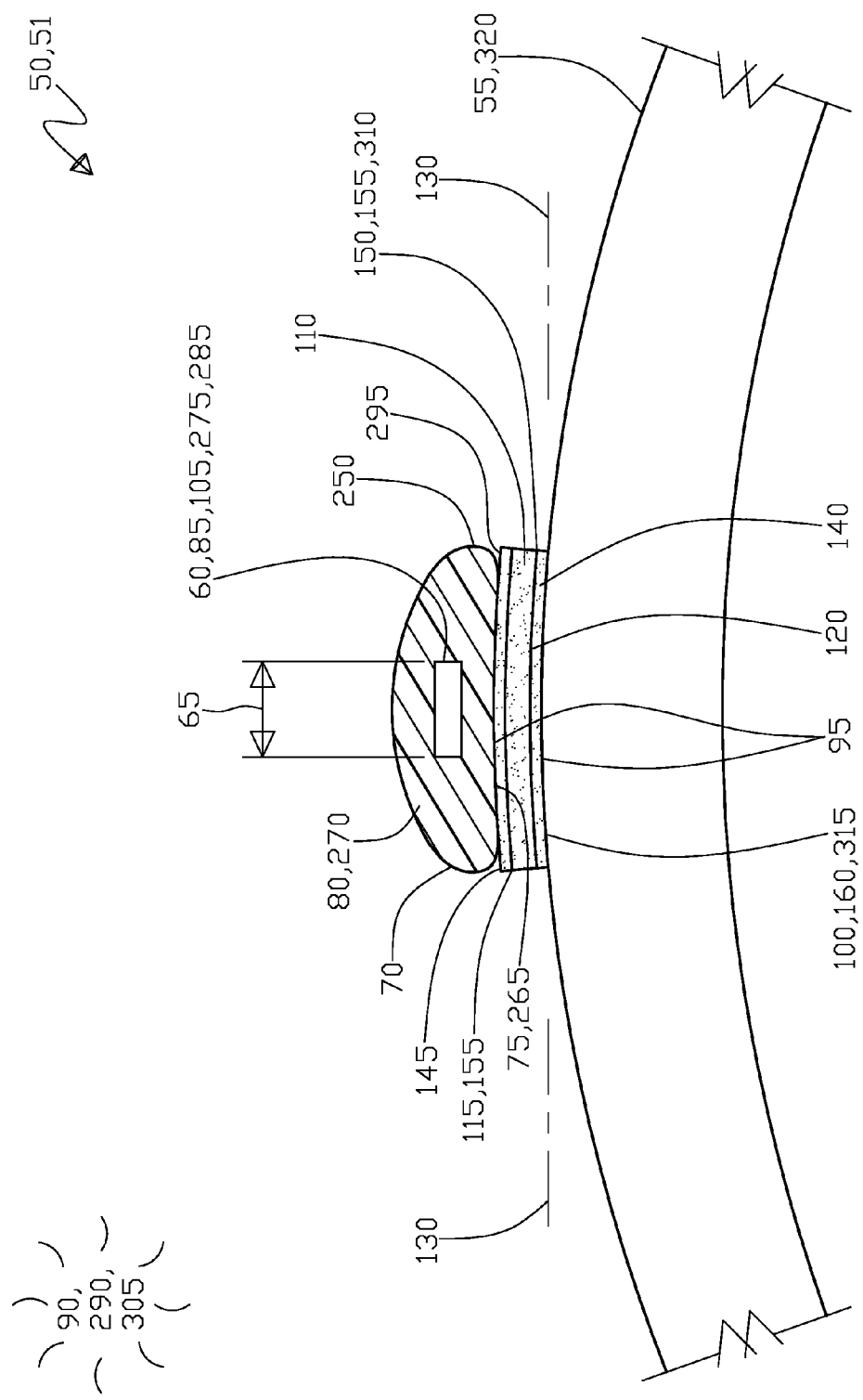
FIG. 4 is cross section 4-4 from FIG. 1 that shows the surface or in particular the helmet outer surface, the adhesive layer, the flexible strip, the cohesive adhesive layer, the planar body having a first and second side, the lighting element, with a light area shown.

Further, FIG. 4 is cross section 4-4 from FIG. 1 that shows the surface 55 or in particular the helmet outer surface 320, the adhesive layer 95, the flexible strip 110, the cohesive 155 adhesive 95 layer, the planar body 70 having a first 75 and second 80 side, the lighting element 60, with a light area 65 shown.

Figure 5:
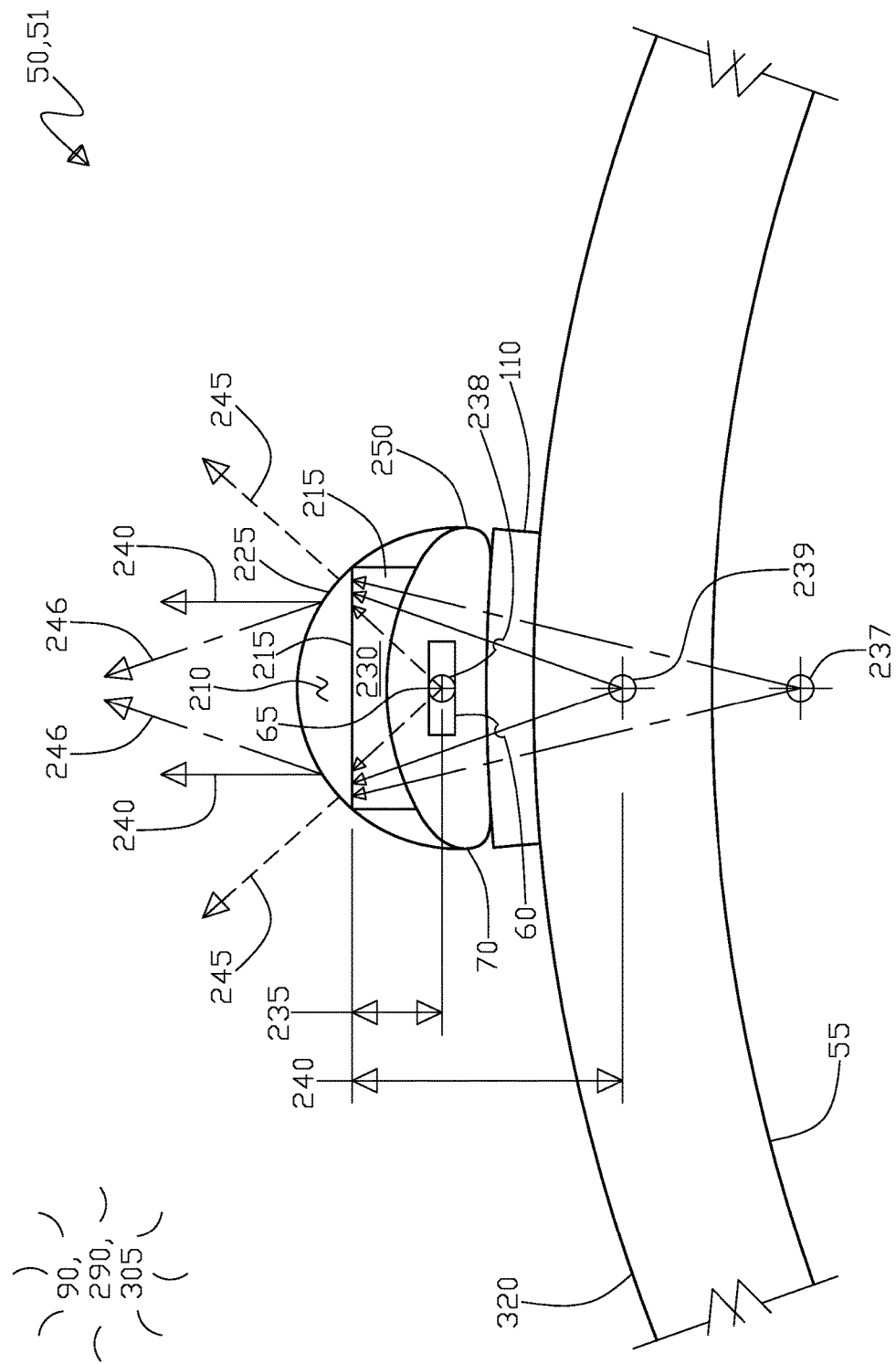
FIG. 5 is cross section 5-5 from FIG. 1 that is similar to FIG. 4 except that the focus is upon an added rigid plano convex lens being disposed adjacent to the lighting element, also shown is the surface or in particular the helmet outer surface, the adhesive layer, the flexible strip, the cohesive adhesive layer, the planar body having a first and second side, the lighting element.

Moving onward, FIG. 5 is cross section 5-5 from FIG. 1 that is similar to FIG. 4 except that the focus is upon an added rigid plano convex lens 210 being disposed adjacent and facing the 230 the lighting element 60, also shown is the surface 55 or in particular the helmet outer surface 320, the adhesive 95 layer, the flexible strip 110, the cohesive 155 adhesive 95 layer, the planar body 70 having the first 75 and second 80 sides, and the lighting element 60 are shown.

Figure 6:
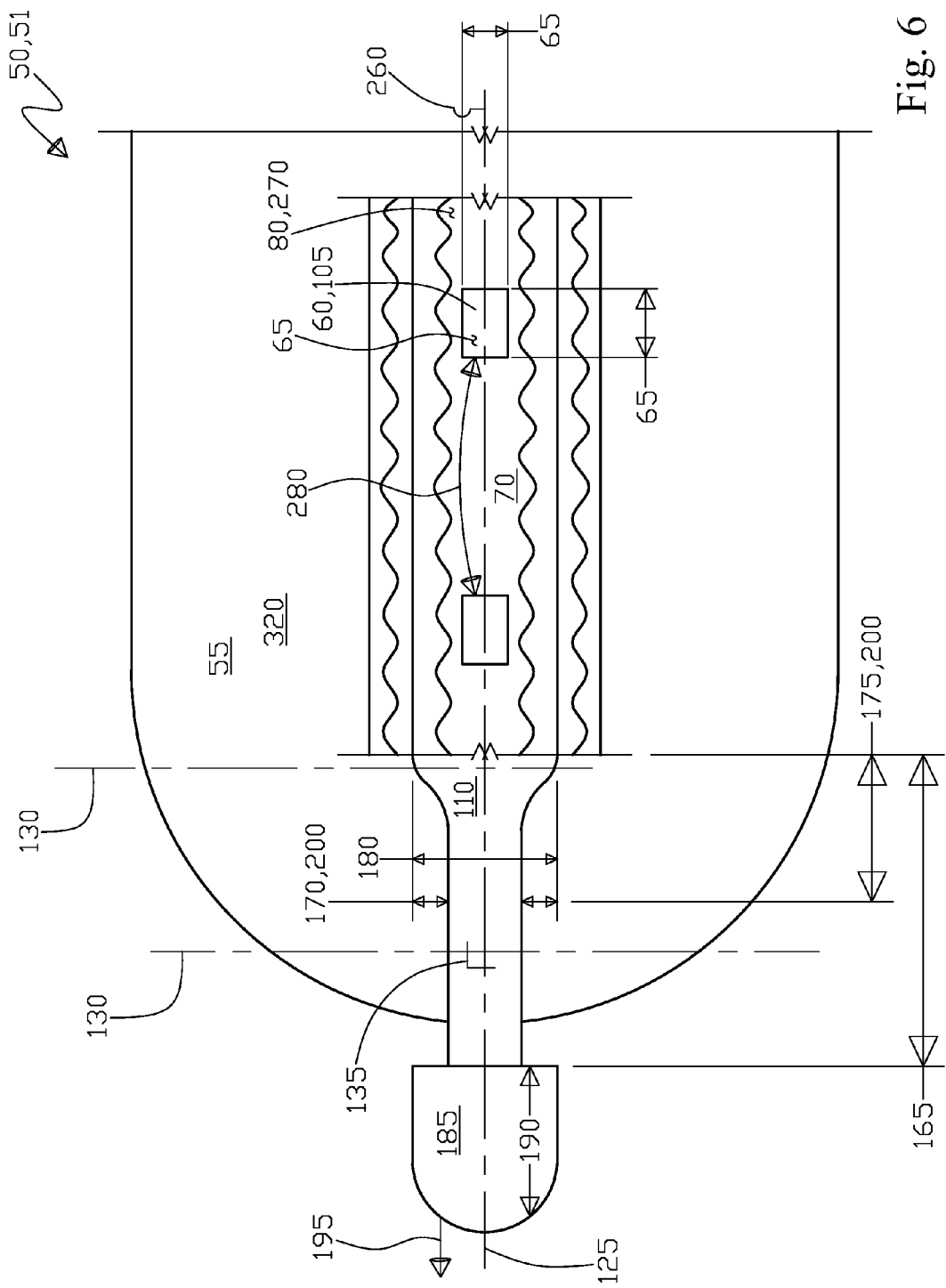
FIG. 6 shows a plan view of the lighting apparatus with the helmet outer surface, the planar body with lighting elements, the light area, the flexible strip including a non-adhesive portion, plus the viscoelasticity of the flexible strip showing an area reduction with pulling along the longitudinal axis showing the area reduction along both the lateral axis and the longitudinal axis.

Next, FIG. 6 shows a plan view of the lighting apparatus 50 with the helmet outer surface 55, 320, the planar body 70 with lighting elements 60, the light area 65, the flexible strip 110 including a non-adhesive portion 185, plus the viscoelasticity of the flexible strip 110 showing an area reduction 200 with pulling 195 along the longitudinal axis 125 showing the area reduction 200 along both the lateral axis 130 and the longitudinal axis 125.

Figure 7:
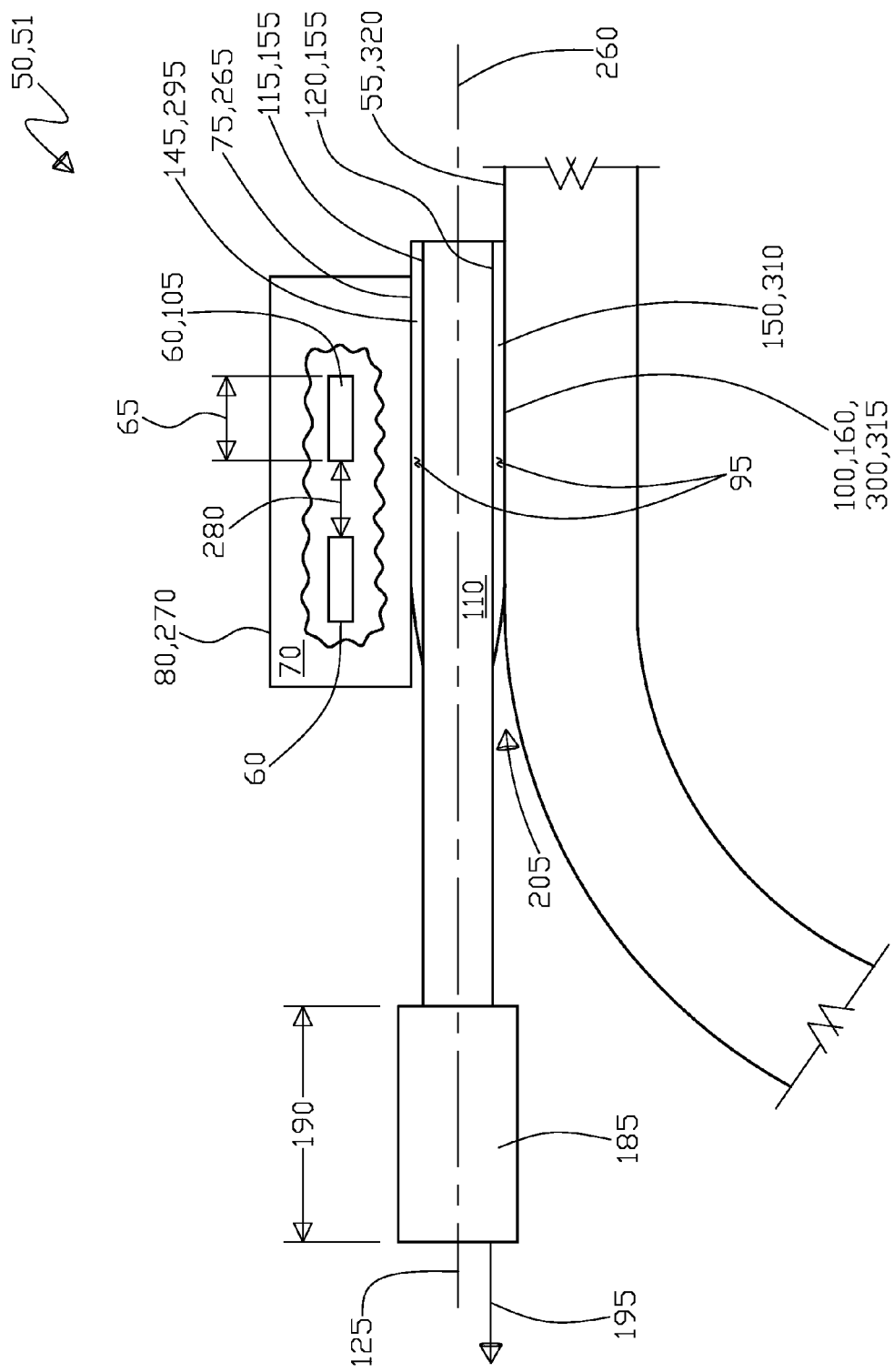

Yet further, FIG. 7 shows a side elevation view of the lighting apparatus 50 as depicted in FIG. 6, wherein FIG. 7 shows the helmet outer surface 55, 320, the planar body 70 with lighting elements 60, the light area 65, the flexible strip 110 including a non-adhesive portion 185, plus the viscoelasticity of the flexible strip 110 showing an area reduction 200 with pulling 195 along the longitudinal axis 125 showing the area reduction 200 along the longitudinal axis 125 with a shear de-bonding 205 of the adhesive 100 as between the helmet outer surface 55, 320 and the secondary surface 120 of the flexible strip 110.

Broadly, in referring to FIGS. 1 to 7, the lighting apparatus 50 for mounting on the surface 55 is disclosed, the lighting apparatus 50 includes a light emitting element 60, a planar body 70 having a first side 75 and an opposing second side 80, the planar body 70 is at least partially transparent, wherein the light emitting element 60 is disposed 85 within the planar body 70 that is positioned between the first 75 and second 80 sides, wherein the light emitting element 60 is visible from the second side 80, see in particular FIGS. 1 and 4.

Also included in the lighting apparatus 50 is an adhesive 95 disposed on the first side 75, wherein the adhesive 95 is affixed to the surface 55, wherein the lighting apparatus 50 is operational to enable the surface 55 to have visibility 105 from the light emitting element 60, see FIG. 2.

As an option for the lighting apparatus 60 for mounting on the surface 55, wherein the planar body 70 is preferably constructed of a transparent polymer that is flexible and water resistant.

A further option for the lighting apparatus 50 for mounting on the surface 55, wherein the adhesive 95 is constructed of a flexible strip 110 having a primary surface 115 and an opposing secondary surface 120, with a longitudinal axis 125 and a perpendicularly positioned 135 lateral axis 130 disposed between the primary 115 and secondary 120 surfaces, wherein the primary surface 115 is coated with an adhesive 95 and the secondary surface 120 is coated with an adhesive 95, wherein the primary surface 115 is adhered 145 to the planar body 70 first side 75 and the secondary surface 120 is adhered 150 to the surface 55, see in particular FIGS. 4 to 7.

Yet another option for the lighting apparatus 50 for mounting on the surface 55, wherein the adhesive 95 has a higher cohesive strength 155 to the flexible strip 110 and a lower adhesive strength 160 to the surface 55, wherein the purpose of this is to help insure that the adhesive 95 residue tends to stay on the flexible strip 110 and tends not to stay on the surface 55.

Further, optionally, for the lighting apparatus 50 for mounting on the surface 55, wherein the flexible strip 110 is constructed of a viscoelastic strip 165 that can stretch 170 in the longitudinal 125 and the lateral 130 axes an amount equal to at least one and one-half (1.5) times an original dimension 175, 180 of the elastic strip 165 along either of the longitudinal 125 or lateral, as best shown in FIGS. 6 and 7.

The viscoelastic elastic strip 165 includes a free end portion 185 that has no adhesive 95 that extends beyond 190 the planar body 70, see in particular FIG. 1 (free end portion 185 is a non-stretched state), plus FIGS. 6 and 7 (free end portion 185 is a stretched state), Operationally, the free end portion 185 is manually pulled 195 substantially parallel to the longitudinal axis 125 (in going from FIG. 1 to FIGS. 6 and 7) to stretch the viscoelastic strip 165 to place the adhesive 95 in an area reducing 200 and shear de-bonding state 205 leaving almost no adhesive 95 residue and almost no damage to the surface 55 upon selected manual removal of the lighting apparatus 50 from the surface 55, again see FIGS. 6 and 7.

Another alternative option for the lighting apparatus 50 for mounting on the surface 55, wherein the viscoelastic strip 165 is preferably constructed of a polymeric sheet, noting that the desirable properties of the viscoelastic strip 165 being preferably constructed of a polymeric sheet are that it has "creep" in other words permanent strain deformation during the stretching area reduction 195, 200 to permanently shear de-bond 205 the adhesive, plus to provide for more safety as the viscoelastic strip 165 will not tend to "snap back" when stretched 195, 200 that could potentially harm a user, see FIGS. 6 and 7.

A continuing alternative option for the lighting apparatus 50 for mounting on the surface 55, wherein the planar body 70 second side 80 further comprises a rigid plano convex lens 210 having a plano side 215 and an opposing convex side 225, the rigid plano convex lens 210 is positioned such that said plano side 215 faces 230 the light emitting element 60, see in particular FIG. 5, plus also FIG. 1. Further, the light emitting element 60 is disposed at a lens distance 235 away from the plano side 230 that is less than a focal point 239 distance 240 of the rigid plano convex lens 210, wherein operationally the rigid plano convex lens 210 acts to amplify 245 a light area 65 of the light emitting element 60, again see in particular FIG. 5 and then also FIG. 1.

FIG. 5 also shows the light ray patterns for the three cases of the rigid plano convex lens 210, being the light source at the focal point 239 distance 240 with the light rays depicted as solid lines, further with the light source at a further distance 237 than the focal point 239 as indicated by light rays converging 246 with phantom lines, and the third case of the light source at a distance less 238 than the focal point 239 wherein the light rays are diverging as indicated by the dashed lines 245 for amplification 245 of the light source, or preferably in this case the light area 65 of the lighting element 60, again see FIGS. 1 and 5.

As an alternative embodiment for the lighting apparatus 51, for mounting on the helmet outer surface 320, the lighting apparatus 51 includes a plurality of light emitting elements 60, plus an elongated flexible body 250 in the form of a band 255 having a lengthwise axis 260, the elongated flexible body 250 including a planar first side 265 and an opposing outwardly projecting arcuate second side 270.

Wherein the plurality of light emitting elements 60 are disposed 275 within the elongated flexible body 250, further the plurality of light emitting elements 60 are positioned in a spaced apart manner 280 along the lengthwise axis 260, further the plurality of light emitting elements 60 are positioned 285 between the planar first side 265 and the outwardly projecting arcuate second side 270, see FIGS. 1, 3, and 4. Wherein the plurality of light emitting elements 60 are visible 290 from the outwardly projecting arcuate second side 270, see FIG. 1.

Also for the alternative embodiment for the lighting apparatus 51, an adhesive 95 is disposed 295 on said planar first side 265, wherein the adhesive 95 is affixed 300 to the helmet outer surface 320, wherein the alternative embodiment lighting apparatus 51 is operational to enable the helmet outer surface 320 to have visibility 305 from the plurality of light emitting elements 60, see FIGS. 1, 2, and 4.

As an option for the alternative embodiment for the lighting apparatus 51, for mounting on the helmet outer surface 320, wherein the elongated flexible body 250 is preferably constructed of a transparent polymer that is water resistant.

As an option for the alternative embodiment for the lighting apparatus 51, for mounting on the helmet outer surface 320, wherein the adhesive 95 is preferably constructed of a flexible strip 110 having a primary surface 115 and an opposing secondary surface 120, with a longitudinal axis 125 and a perpendicularly positioned 135 lateral axis 130 disposed between the primary 115 and secondary 120 surfaces, see FIG. 1 and FIGS. 4 to 7. Wherein the primary surface 115 is coated with an adhesive 95 and the secondary surface 120 is coated with an adhesive 95, wherein the primary surface 115 is adhered to the elongated flexible body 250 planar first side 265 and the secondary surface 120 is adhered 310 to the helmet outer surface 320, again see FIG. 1 and FIGS. 4 to 7.

As another option for the alternative embodiment for the lighting apparatus 51, for mounting on the helmet outer surface 320, wherein the adhesive 95 has a higher cohesive strength 155 to the flexible strip 110 and a lower adhesive 95 strength 315 to the helmet outer surface 320, see FIG. 4.

As a further option for the alternative embodiment for the lighting apparatus 51 for mounting on the helmet outer surface 320, wherein the flexible strip 110 is preferably constructed of a viscoelastic strip 165 that can stretch 165, 170 in the longitudinal 125 and the lateral 130 axes an amount equal to at least one and one-half (1.5) times an original dimension of the elastic strip 165 along either of the longitudinal 125 or lateral 130 axes, see FIGS. 6 and 7.

The viscoelastic elastic strip 165 includes a free end portion 185 that has no adhesive 95 that extends beyond 190 the elongated flexible body 250, see FIGS. 1, 6, and 7. Operationally, the free end portion 185 is manually pulled 195 substantially parallel to the longitudinal axis 125 to stretch 200 the viscoelastic strip 165 to place the adhesive 95 in an area reducing 200 and shear de-bonding 205 state leaving almost no adhesive 95 residue and almost no damage to the helmet outer surface 320 upon selected manual removal of the alternative embodiment of the lighting apparatus 51 from the helmet outer surface 320, see again FIGS. 1, 6, and 7.

As yet a further option for the alternative embodiment for the lighting apparatus 51 for mounting on the helmet outer surface 320, wherein the viscoelastic strip 165 is preferably constructed of a polymeric sheet. Noting that the desirable properties of the viscoelastic strip 165 being preferably constructed of a polymeric sheet are that it has "creep" in other words permanent strain deformation during the stretching area reduction 195, 200 to permanently shear de-bond 205 the adhesive, plus to provide for more safety as the viscoelastic strip 165 will not tend to "snap back" when stretched 195, 200 that could potentially harm a user, see FIGS. 6 and 7.

As yet a further option for the alternative embodiment for the lighting apparatus 51 for mounting on the helmet outer surface 320, wherein the elongated flexible body 250 outwardly projecting arcuate second side 270 further comprises a rigid plano convex lens 210 having a plano side 215 and an opposing convex side 225, the rigid plano convex lens 210 is positioned such that said plano side 215 faces 230 the light emitting element 60, see in particular FIG. 5, plus also FIG. 1.

Further, the light emitting element 60 is disposed at a lens distance 235 away from the plano side 230 that is less than a focal point 239 distance 240 of the rigid plano convex lens 210, wherein operationally the rigid plano convex lens 210 acts to amplify 245 a light area 65 of the light emitting element 60, again see in particular FIG. 5 and then also FIG. 1.

FIG. 5 also shows the light ray patterns for the three cases of the rigid plano convex lens 210, being the light source at the focal point 239 distance 240 with the light rays depicted as solid lines, further with the light source at a further distance 237 than the focal point 239 as indicated by light rays converging 246 with phantom lines, and the third case of the light source at a distance less 238 than the focal point 239 wherein the light rays are diverging as indicated by the dashed lines 245 for amplification 245 of the light source, or preferably in this case the light area 65 of the lighting element 60, again see FIGS. 1 and 5.

The invention claimed is:

1. A flexible lighting apparatus with an adhesive for mounting to a helmet outer surface, said flexible lighting apparatus comprises:
    (a) a light emitting element;
    (b) a planar body having a first side and an opposing second side, said planar body is at least partially transparent, wherein said light emitting element is disposed within said planar body positioned between said first and second sides, wherein said light emitting element is visible from said second side;
    (c) a flexible strip having a primary surface and an opposing secondary surface, with a longitudinal axis and a perpendicularly positioned lateral axis disposed between said primary and secondary surfaces, wherein said primary surface is coated with an adhesive layer and said secondary surface is coated with an adhesive layer, wherein said primary surface is adhered to said planar body first side and said secondary surface is adhered to the helmet outer surface, wherein said flexible lighting apparatus is operational to enable the helmet outer surface to have visibility from light emitted by said light emitting element; and
    (d) a rigid plano convex lens disposed on said planar body over said planar body second side, said rigid plano convex lens having a plano side and an opposing convex side, said rigid plano convex lens is positioned such that said plano side faces and is centered over said light emitting element being supported on said planar body a downwardly depending sidewall and said light emitting element is disposed at a lens distance away from said plano side that is less than a focal point distance of said rigid plano convex lens, wherein operationally said rigid plano convex lens acts to increase a perceived light area of said light emitting element in both area and brightness when viewed from said rigid plano lens convex side.

2. A flexible lighting apparatus for mounting to a helmet outer surface according to claim 1 wherein said planar body is constructed of a transparent polymer that is flexible and water resistant.

3. A flexible lighting apparatus for mounting to a helmet outer surface according to claim 1 wherein said adhesive layer on said secondary surface has a higher cohesive strength to said flexible strip and a lower adhesive strength to the helmet outer surface.

4. A flexible lighting apparatus for mounting to a helmet outer surface according to claim 3 wherein said flexible strip is constructed of a viscoelastic strip that can stretch in said longitudinal and said lateral axes an amount equal to at least one and one-half (1.5) times an original dimension of said viscoelastic strip along either of said longitudinal or lateral axes, said viscoelastic elastic strip includes a free end portion that has no adhesive layer that extends beyond said planar body, operationally said free end portion is manually pulled substantially parallel to said longitudinal axis to stretch said viscoelastic strip to place said secondary surface adhesive layer in an area—reducing and shear—de-bonding state leaving almost no residue and almost no damage to the surface upon selected removal of said flexible lighting apparatus from the helmet outer surface.

5. A flexible lighting apparatus for mounting to a helmet outer surface according to claim 4 wherein said viscoelastic strip is constructed of a polymeric sheet.

6. A flexible lighting apparatus with an adhesive for mounting on a helmet outer surface, said flexible lighting apparatus comprises:
    (a) a plurality of light emitting elements;
    (b) an elongated flexible body in the form of a band having a lengthwise axis, said elongated flexible body including a planar first side and an opposing outwardly projecting arcuate second side, wherein said plurality of light emitting elements are disposed within said elongated flexible body, further said plurality of light emitting elements are positioned in a spaced apart manner along said lengthwise axis, further said plurality of light emitting elements are positioned between said planar first side and said outwardly projecting arcuate second side, wherein said plurality of light emitting elements are visible from said outwardly projecting arcuate second side;

(c) a flexible strip having a primary surface and an opposing secondary surface, with a longitudinal axis and a perpendicularly positioned lateral axis disposed between said primary and secondary surfaces, wherein said primary surface is coated with an adhesive layer and said secondary surface is coated with an adhesive layer, wherein said primary surface is adhered to said elongated flexible body planar first side and said secondary surface is adhered to the helmet outer surface, wherein said flexible lighting apparatus is operational to enable the helmet outer surface to have visibility from light emitted by said plurality of light emitting elements; and (d) a plurality of individual rigid plano convex lenses each disposed on said elongated flexible body outwardly projecting arcuate second side, said plurality of rigid plano convex lenses each having a plano side and an opposing convex side, each said rigid plano convex lens is positioned such that each said plano side faces and is centered over each said light emitting element, each said rigid plano convex lens being supported by a downwardly depending sidewall and each said light emitting element is disposed at a lens distance away from each said plano side that is less than a focal point distance of each said rigid plano convex lens, wherein operationally each said rigid plano convex lens acts to increase a perceived light area of each said light emitting element in both area and brightness when viewed from each said rigid plano lens convex side.

7. A flexible lighting apparatus for mounting on a helmet outer surface according to claim 6 wherein said elongated flexible body is constructed of a transparent polymer that is water resistant.

8. A flexible lighting apparatus for mounting on a helmet outer surface according to claim 6 wherein said adhesive layer on said secondary surface has a higher cohesive strength to said flexible strip and a lower adhesive strength to the helmet outer surface.

9. A flexible lighting apparatus for mounting on a helmet outer surface according to claim 8 wherein said flexible strip is constructed of a viscoelastic strip that can stretch in said longitudinal and said lateral axes an amount equal to at least one and one-half (1.5) times an original dimension of said viscoelastic strip along either of said longitudinal or lateral axes, said viscoelastic elastic strip includes a free end portion that has no adhesive that extends beyond said elongated flexible body, operationally said free end portion is manually pulled substantially parallel to said longitudinal axis to stretch said viscoelastic strip to place said secondary surface adhesive layer in an area—reducing and shear—debonding state leaving almost no adhesive layer residue and almost no damage to the helmet outer surface upon selected removal of said flexible lighting apparatus from the helmet outer surface.

10. A flexible lighting apparatus for mounting on a helmet outer surface according to claim 9 wherein said viscoelastic strip is constructed of a polymeric sheet.

* * * * *